United States Patent [19]
Choi

[11] Patent Number: 5,619,082
[45] Date of Patent: Apr. 8, 1997

[54] ELECTRIC MOTOR WITH SEALING STRUCTURE RESISTING THE ENTRY OF SAND AND DUST

[75] Inventor: Jong-Han Choi, Suwon, Rep. of Korea

[73] Assignee: Samsung Electronics Co., Ltd., Suwon, Rep. of Korea

[21] Appl. No.: 529,108

[22] Filed: Sep. 15, 1995

[30] Foreign Application Priority Data

Sep. 16, 1994 [KR] Rep. of Korea .................. 94-24063 U

[51] Int. Cl.⁶ .................................................. H02K 5/10
[52] U.S. Cl. .................................................. 310/88; 310/89
[58] Field of Search ............................... 310/88, 89, 42

[56] References Cited

U.S. PATENT DOCUMENTS

| | | | |
|---|---|---|---|
| 3,766,453 | 10/1973 | Schenk et al. | 310/88 |
| 3,846,652 | 11/1974 | Lykes | 310/90 |
| 4,532,446 | 6/1985 | Yamamoto et al. | 310/87 |
| 4,586,880 | 5/1986 | Inao et al. | 417/424 |
| 4,671,125 | 6/1987 | Yabunaka | 74/7 E |
| 5,009,781 | 3/1992 | Frank | 118/52 |
| 5,111,093 | 5/1992 | Tanaka | 310/88 |
| 5,235,228 | 8/1993 | Nakanura et al. | 310/51 |

FOREIGN PATENT DOCUMENTS

55-130589  9/1980  Japan.

*Primary Examiner*—Thomas M. Dougherty
*Assistant Examiner*—Michael Wallace, Jr.
*Attorney, Agent, or Firm*—Burns, Doane, Swecker & Mathis, L.L.P.

[57] ABSTRACT

An electrical motor includes a case having a shaft hole formed therein through which a driven shaft of the motor projects. The case includes an exteriorly disposed cylindrical flange surrounding the shaft hole at a radial distance therefrom. Disposed in a cylindrical recess formed by the flange is a first sealing member which has a sealing hole extending therethrough. The shaft extends through the sealing hole, with the shaft rotatably supported by the sealing hole so that the passage of sand and dust through the sealing hole is essentially blocked. A fixing member is secured by interference fit within the recess to retain the first sealing member in place. A second sealing member secured to an outer surface of the flange by an interference fit includes a wall extending across an outer end of the recess to resist the entry of sand and dust into the recess. The shaft extends through through-holes formed in the fixing member and the wall of the second sealing member.

3 Claims, 2 Drawing Sheets

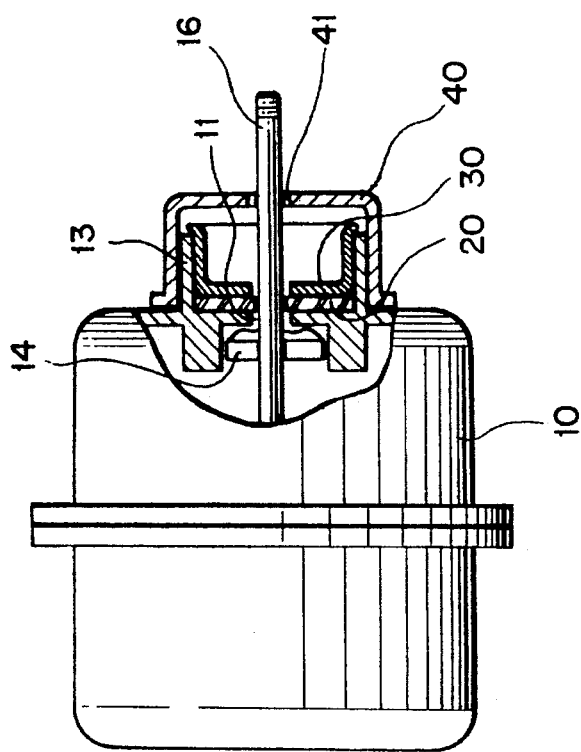
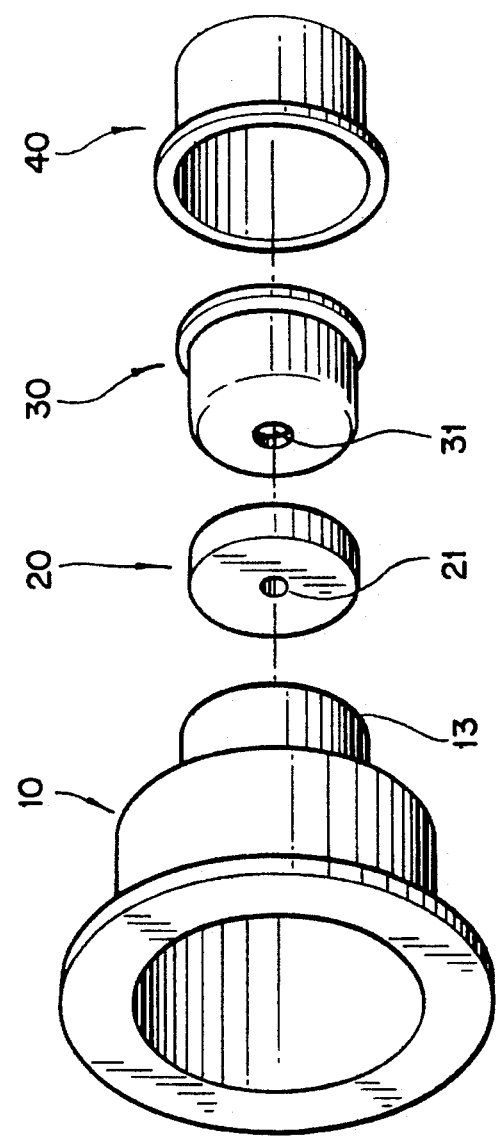
FIG. 3
FIG. 4

5,619,082

ELECTRIC MOTOR WITH SEALING STRUCTURE RESISTING THE ENTRY OF SAND AND DUST

BACKGROUND OF THE INVENTION

1. Field of the Invention

The present invention relates to a motor for electric home appliances such as an air conditioner and the like to thereby generate rotary power, and more particularly to a motor which can be used even in the desert where sand, dust and the like abound.

2. Description of the Prior Art

Generally, electric motors for generating rotary power have been disclosed in various types.

By way of example, Japanese laid open utility model No. Sho 55-130589 (laid open on the 16th of September, Showa 55) is disclosed. The motor, as illustrated in FIGS. 1 and 2, is provided at a side of its case 22 with a deformation prevention unit 5 comprising a concave compression 6 formed in a lower end of the case by way of a press. Periphery portions of a rotor within the case 22 are provided with a pair of brushes 12, while a body depression 1a of speed control element 1 is provided in the concave unit 6 outside of the case in order to prevent the same from protruding beyond the case.

There is a problem in the conventional motor thus constructed in that sand, dust and the like can penetrate into the case 22 through a space 8 formed between the case 22 and a shaft 7 of the motor, although there is an advantegeous effect in the motor of preventing failure of the speed control element 1 because the same is protected within the concave unit 6.

There is another problem in that bearings and other various parts can be abraded or damaged by sand, dust and the like to thereby generate excessive noise and vibration and to shorten the life of the motor when the motor is used in the desert where sand, dust and the like are abundant. The sand, dust and like penetrate into the case 22 through space (8) formed between the case 22 and the shaft 7 of the motor.

The present invention is disclosed to solve the aforementioned problems and it is an object of the present invention to provide a motor which can prevent sand, dust and the like from entering a case, to thereby increase the life and reliability of the motor.

SUMMARY OF THE INVENTION

In accordance with the present invention, the object can be accomplished by providing a motor employing a case for encasing a rotor and a stator therein and a shaft protruding outside of the case through a shaft hole formed in the case, the motor comprising:

a cylindrical flange formed at a predetermined distance from the shaft hole;

first sealing means disposed within the cylindrical flange and for being centrally formed thereat with a through hole for the shaft passage, in order to prevent sand and dust from penetrating into the case;

a fixing member for being fixedly inserted into the cylindrical flange in order to retain the first sealing member; and second sealing means for being provided at a periphery of the cylindrical flange in order to prevent sand, dust from penetrating into the case.

BRIEF DESCRIPTION OF THE DRAWINGS

For a better understanding of the nature and objects of the invention, reference should be made to the following detailed description taken in conjunction with the accompanying drawings in which:

FIG. 3 is a side view of a motor, partially broken away, thereof according to an embodiment of the present invention; and FIG. 4 is an exploded perspective view for illustrating a case, a flange, a first sealing unit, a fixing unit and a second sealing unit according to the present invention.

DETAILED DESCRIPTION OF A PREFERRED EMBODIMENT OF THE INVENTION

Figure 1:
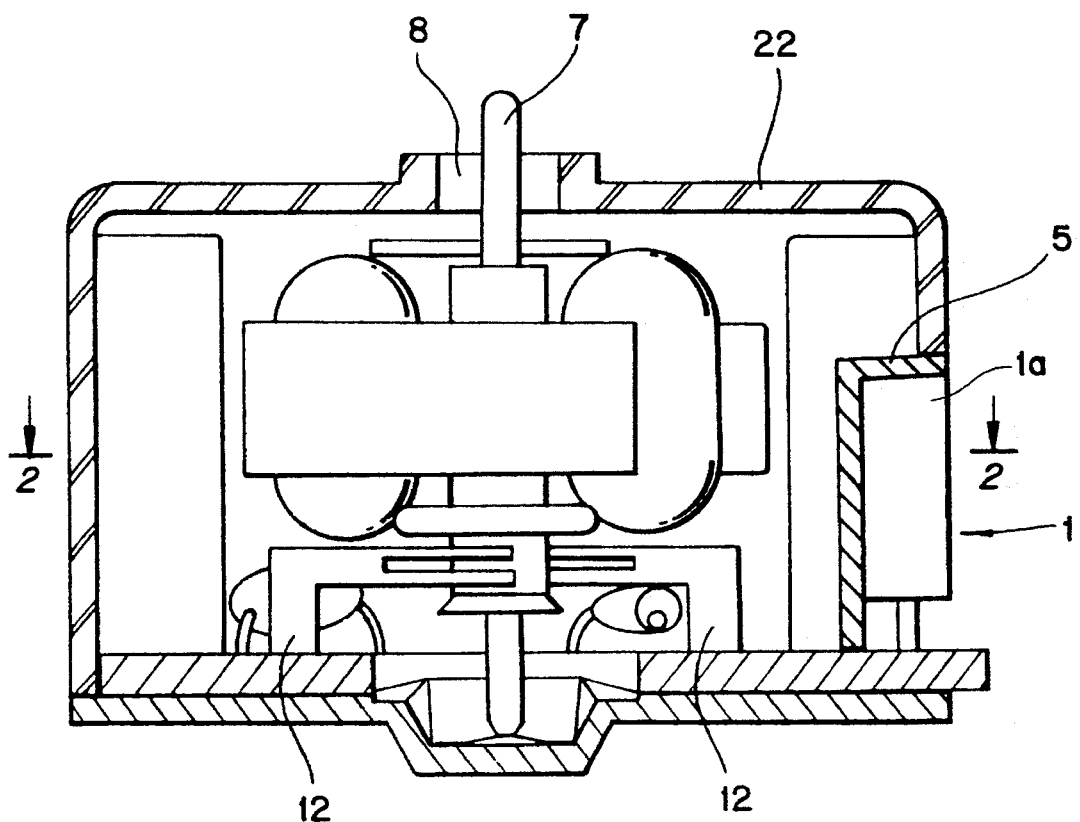
FIG. 1 is an enlarged sectional view of a motor according to the prior art.
Figure 2:
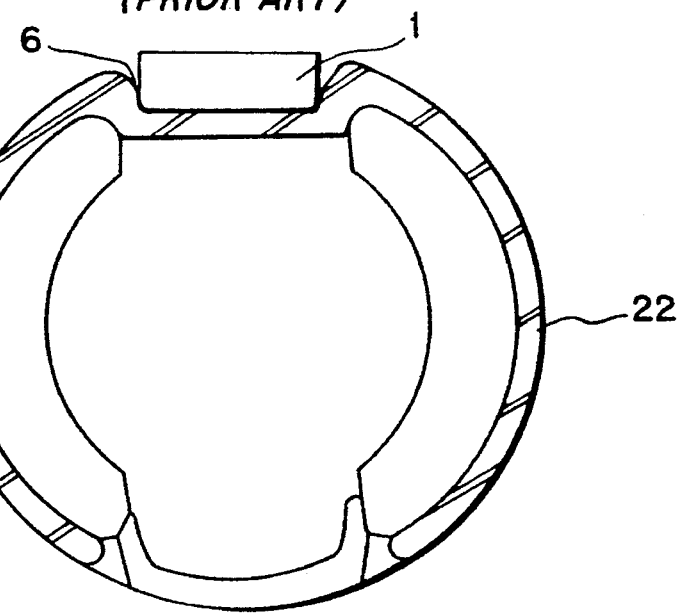
FIG. 2 is a cross sectional view taken along line 2—2 in FIG. 1.

The preferred embodiment of the motor according to the present invention will now be described in detail with reference to the accompanying drawings.

Referring to FIGS. 3 and 4, a case 10 acting as an enclosure for housing parts such as rotor, stator and the like is perforated at one side thereof with a shaft hole 11, through which a shaft 16 extends outwardly.

The shaft portion 16 within the case 10 extends through a bearing 14 in order to smoothly rotate the shaft 16.

The case 10 is integrally formed at a periphery thereof with a cylindrical flange 13 at a predetermined distance from the shaft hole 11.

The flange 13 of the case 10 forms a recess containing a sealing disk 20 which is perforated centrally with a through hole 21 in order to prevent sand, dust and the like from entering the case 10 and at the same time, to support the shaft 16. The disk 20 is made of such material as oily asbestos or the like.

The sealing disk 20 constitutes a first sealing means so disposed within the flange 13 and so inserted onto a periphery of the shaft 16 that sand, dust and the like can be prevented from entering into the case 10 through the shaft hole 11, and that the shaft 16 can be supported thereby to smoothly rotate the same.

Furthermore, a fixing member 30 of a cup shape provided centrally with a through hole 31 for the shaft to pass therethrough is positioned to the outside of the first sealing member 20 disposed in the flange 13, so that the first sealing means 20 is retained in place.

In the aforementioned description, the fixing member 30 includes a radial wall portion 30R and a cylindrical wall portion 30C. The radial wall portion 30R possesses the hole 31 and engages an outer surface of the first sealing disk 20. The cylindrical wall portion 30C is coupled to an inner periphery of the flange 13 by way of an interference fit because an outer diameter of the cylindrical wall portion 30C is formed larger than an inner diameter of the flange 13. Once installed, the fixing member 30 serves to support the first sealing means 20 at an inner side of the flange 13 and at the same time, to support the periphery of the shaft 16.

The flange 13 is coupled at the periphery thereof to a second sealing means 40 made of such insulative material as rubber and the like, the coupling being made by way of interference fit.

The second sealing means 40 is formed at a central part thereof with a through hole 41 to accommodate passage of the shaft 16.

Next, the assembly procedures for prinicipal parts of the motor according to the present invention thus constructed will be described along with the operation thereof.

First of all, the flange 13 of the case 10 receives the first sealing means 20.

At this time, because the through hole 21 of the first sealing means 20 serves to make a partial contact with the periphery of the shaft 16, the hole 21 functions as a sealing hole whereby sand, dust and like are prevented from penetrating into the case 10 and at the same time, the shaft 16 is supported to have a smooth rotation.

The first sealing means 20 is not bolted in place because, once the first sealing means 20 is inserted into the flange 13, the fixing member 30 is coupled to the flange 13 by way of the interference fit to thereby cause the first sealing means 20 to be tightly fixed.

Furthermore, once the fixing member 30 is coupled to the flange 13 by way of interference fit, the second sealing means 40 is tightly fixed to the flange 13 by way of the interference fit.

Consequently, sand, dust and the like are initially prevented from penetrating through the second sealing means 40 into the case 10, and any dust, sand and the like which have passed the second sealing means 40 are kept from penetration by the first sealing means 20.

Accordingly, sand, dust and the like cannot penetrate into the case 10 through the shaft hole 11 formed between the shaft 16 and the case, thereby preventing abrasion of and damage to the parts such as the bearings and the like and prolonging the life of the motor and improving the reliability thereof.

What is claimed is:

1. An electric motor comprising:

a case enclosing a rotor and stator;

a driven shaft protruding to the outside of the case through a shaft hole formed in the case;

a cylindrical flange projecting axially outwardly from an exterior surface of the case, the flange surrounding the shaft hole and spaced a predetermined radial distance therefrom, the flange being of integral one-piece construction with the case;

a first sealing member disposed within a cylindrical recess formed by the flange, the first sealing member including a sealing hole aligned with the shaft hole, with the driven shaft extending through the shaft hole and the sealing hole, the shaft being rotatably supported by the sealing hole with a close tolerance, so that the passage of sand and dust through the sealing hole is obstructed, the first sealing member being in the shape of a disk made of oily asbestos;

a fixing member secured within the cylindrical recess to the outside of the first sealing member to retain the first sealing member in place, the fixing member being in the shape of a cup having a cylindrical wall portion and a radial wall portion, the radial wall portion of the cup-shaped fixing member being in contact with an outer surface of the first sealing member in order to fix the first sealing member within the flange, the cylindrical wall portion being secured to an inner cylindrical surface of the cylindrical flange by an interference fit therewith; and a second sealing member mounted on the flange and including a wall extending across an outer end of the cylindrical recess to resist the entry of sand and dust into the cylindrical recess, the wall including a through-hole aligned with the shaft hole and sealing hole and through which the shaft extends, the second sealing member secured to the cylindrical flange by an interference fit therewith.

2. The motor according to claim 1 wherein the second sealing member is formed of an electrically insulative material.

3. The motor according to claim 1 wherein the second sealing member is secured to an outer cylindrical surface of the cylindrical flange by an interference fit therewith.

* * * * *